United States Patent
Knight

(10) Patent No.: US 6,833,033 B1
(45) Date of Patent: Dec. 21, 2004

(54) GRILL CLEANER AND METHOD

(76) Inventor: Eric Anthony Knight, 7 Cove Cir., Unionville, CT (US) 06085

(*) Notice: Subject to any disclaimer, the term of this patent is extended or adjusted under 35 U.S.C. 154(b) by 190 days.

(21) Appl. No.: 10/348,500

(22) Filed: Jan. 21, 2003

(51) Int. Cl.[7] .................................................. B08B 7/00
(52) U.S. Cl. .......................... 134/6; 134/42; 15/104.93; 15/210.1; 15/244.4
(58) Field of Search .................... 134/6, 42; 15/104.93, 15/210.1, 208, 209.1, 244.4

(56) References Cited

U.S. PATENT DOCUMENTS 3,085,372 A * 4/1963 Sweeney et al. ............ 401/196
4,879,779 A * 11/1989 Zalevsky et al. ......... 15/104.92
5,605,143 A * 2/1997 Hebert et al. ............. 126/41 R
2003/0028985 A1 * 2/2003 Prodoehl et al. ............. 15/118

* cited by examiner

Primary Examiner—Zeinab El-Arini

(57) ABSTRACT

A method of cleaning electric grills including wetting a sheet of fluid-absorbent material constructed to conform to the wave-like contours of the upper and lower heating platters of a typical electric grill, and inserting the wetted material in between the electric grill's heating platters.

12 Claims, 2 Drawing Sheets

GRILL CLEANER AND METHOD

CROSS-REFERENCE TO RELATED APPLICATIONS

Not applicable

FEDERALLY SPONSORED RESEARCH

Not applicable

SEQUENCE LISTING

Not applicable

BACKGROUND

This invention relates to grill cleaners, specifically a grill cleaner that quickly and easily cleans electric grills.

One of the most popular electric grills on the market is sold under the registered trademark "LEAN MEAN FAT REDUCING GRILLING MACHINE," and commonly referred to by the public as the "George Foreman grill." 40 million units of the George Foreman grill have been sold, according to an online report in the Jan. 8, 2003 *The Wahoo Gazette*, http://www.cbs.com/latenight/lateshow/exclusives/wahoo/.

The George Foreman grill cooks food in remarkably little time. However, a universal problem associated with the George Foreman grill (and other similar grills) is the tedious clean up of the grill after its use. The high temperatures generated inside of grill that cause the food to cook quickly also bakes on remnants of the food to the interior surfaces of the grill.

The current methods of cleaning grills include scrubbing heating platters with brushes and sponges, utensils that attempt to dislodge baked-on food from the platter grooves, and a combination of soaps and chemical solvents. All methods are tedious, and because of the work and time involved, likely reduce the use of the grill appliance. The use of soaps, solvents, and other cleaning chemicals increase cleaning costs, can be harsh on hands, and add additional contaminants to the environment.

Grill appliance users would certainly welcome a simple and effective way to clean their grills. They would also certainly appreciate the opportunity to clean their grills without the use of chemicals that could be harmful to themselves, their family, and the environment. The reduction of cleaning chemicals would also add up to significant money savings.

OBJECTS AND ADVANTAGES

Several objects of the present invention are:

(a) to provide a very simple to use and very effective cleaner of electric grills that functions simply by placing the wetted invention between the heating platters of the grill for a short period of time (such as an hour), (b) to provide a very simple to use and very effective cleaner of electric grills that can be reusable or disposable, (c) to provide a very simple to use and very effective cleaner of electric grills that can be manufactured for very low cost, (d) to provide a very simple to use and very effective cleaner of electric grills that can be purchased by the consumer for very low cost, (e) to provide a very simple to use and very effective cleaner of electric grills that functions with just water as the solvent, eliminating the need for chemicals to perform the cleaning function, thus saving costs, reducing family contact with chemicals, and benefiting the environment, (f) to provide a very simple to use and very effective cleaner of electric grills that can be optionally enhanced via its impregnation with soap, surfactant, cleaning substance, germicide, disinfectant, and/or bactericide so that the invention will provide germicidal and/or disinfectant properties upon use, (g) to provide a very simple to use and very effective cleaner of electric grills that can be available on a continuous roll, similar to ordinary paper towel, allowing for the user to easily select a particular length for the particular grill-cleaning task, and (h) to provide a very simple to use and very effective cleaner of electric grills that can also be constructed of a low-density absorbent material (such as a low-density sponge) that will readily conform to the wave-like contours of a grill upon closure of a grill.

Still further objects and advantages will become apparent from a consideration of the ensuing description and drawings.

SUMMARY

In accordance with the present invention a grill cleaner comprising a sheet of wetted fluid-absorbent material that conforms to the wave-like contours of the upper and lower heating platters of a typical electric grill. Also in accordance with the present invention a grill-cleaning method comprising wetting a sheet of fluid-absorbent material constructed to conform to the wave-like contours of the upper and lower heating platters of a typical electric grill, and inserting the wetted material in between the electric grill's heating platters.

REFERENCE NUMERALS IN THE DRAWINGS

1 Top heating platter of grill
2 Top of invention
3 Bottom of invention
4 Bottom heating platter of grill

DETAILED DESCRIPTION OF THE PREFERRED EMBODIMENTS

The applicant has created an invention in which a fluid-absorbent piece of material (such as natural sponge, synthetic sponge, foam rubber and similar foam synthetics, or paper), formed in a wave-like shape that meshes with the wave-like contours of electric grill heating platters, dramatically simplifies the cleaning of an electric grill. The wave-like shape absorbent material, when wetted and placed inside of the grill (when the grill is off and completely cooled from cooking), and left in place for an hour or so, will loosen the baked-on material automatically—so that the baked-on material can be wiped off with incredible ease.

The automatic cleaning action of the invention is substantially due to the wetted fluid-absorbent material maintaining continuous moisture contact with all of the contoured surfaces of the heating platters of the grill, softening and breaking down the adhesion bonds of the baked-on food, and concurrently wicking away food elements (such as greases, fats, and marinade remnants) that have gone into solution or suspension.

Figure 1:
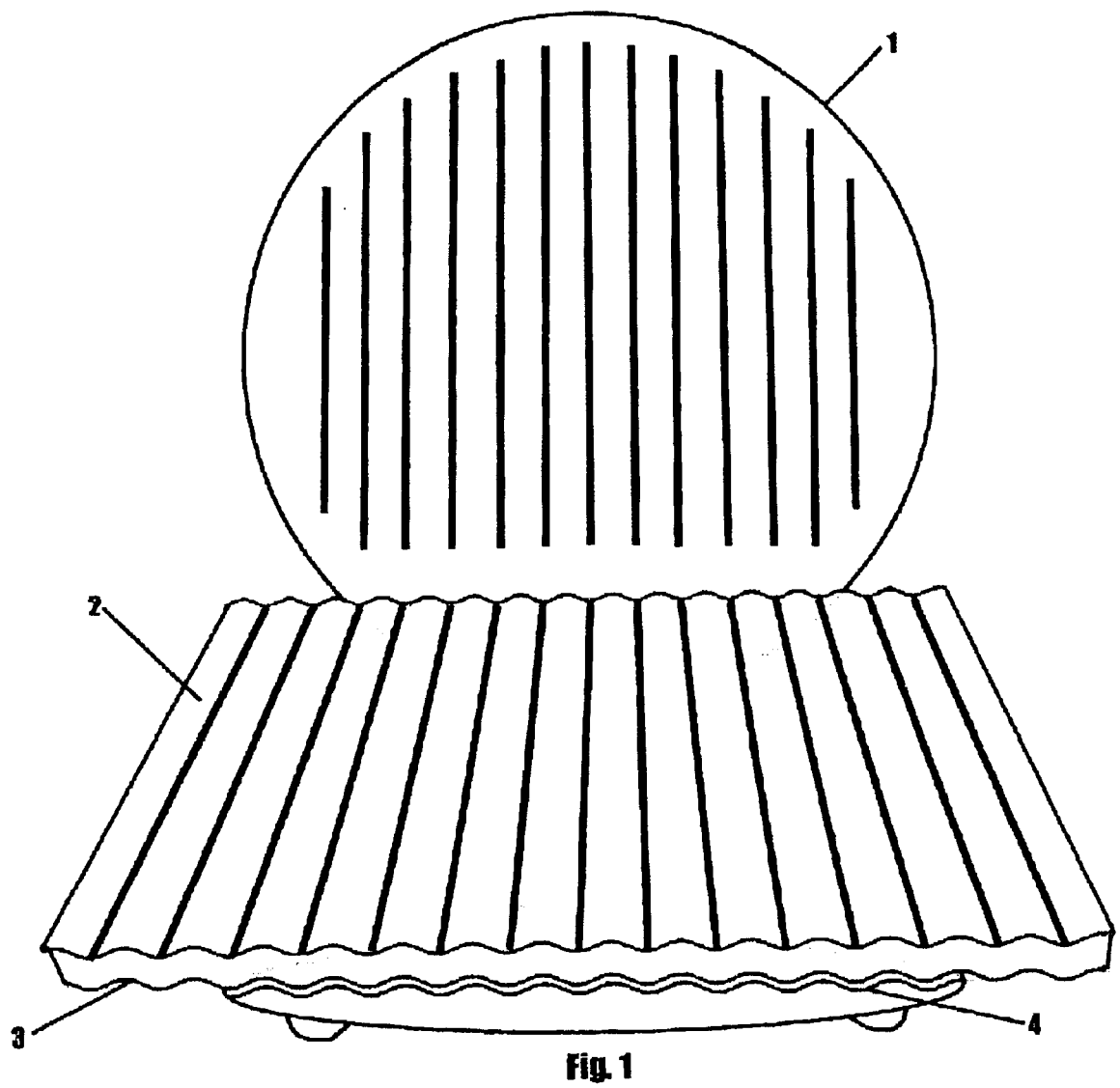
FIG. 1 is an illustration of a typical electric grill, in the open position, with the present invention placed inside.
Figure 2:
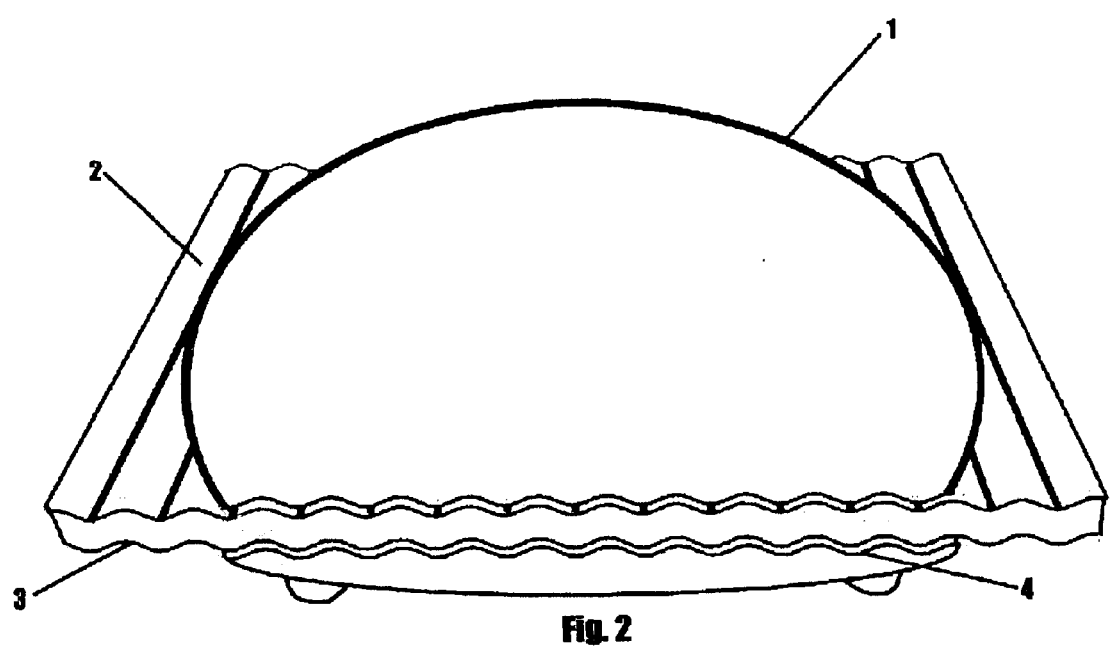
FIG. 2 is an illustration of a typical electric grill, in the closed position, with the present invention placed inside.

A preferred embodiment of the present invention is shown in FIG. 1 and FIG. 2.

The wave-like contours of the top and bottom surfaces of the present invention (2 and 3, respectively) mesh and maintain constant contact with the wave-like contours of the top and bottom heating platters of the grill (1 and 4, respectively) when the grill is in the closed position.

Remarkably, no soap or solvent (other than plain tap water) is needed to accomplish the entire cleaning task. The added benefits of no soap or added solvent include the reduction a household's use of solvents and chemicals; household cost savings; increased household safety due to less chemical use; and minimized chemical contaminants to sewer systems, septic systems, and the environment.

The inventor created a number of versions of the present invention from various materials including foam rubber, various sponge materials, and paper—and achieved excellent performance results from all of the materials tested. In practice, the present invention's overall shape and wave-like contours can be achieved through a variety of common manufacturing methods, including molding, cutting, casting, and pressing.

The present invention's unique shape and material combination dramatically simplifies the cleaning of an electric grill. The present invention can be used in its most simple form, as described, and will do a terrific job at dissolving and dislodging cooked-on food debris.

Another embodiment of the present invention is to impregnate the invention's absorbent material with soap, surfactant, cleaning substance, germicide, disinfectant, and/or bactericide so that the invention will provide germicidal and/or disinfectant properties upon use.

Another embodiment of the present invention is to construct the invention using a sufficiently low-density absorbent material (such as a low-density sponge) that will readily conform to the wave-like contours of the grill upon closure of the grill. In such an embodiment, the manufacturing of the invention could be simplified, as the necessary wave-like contour is created upon closure of the grill, and not during the manufacturing process.

Another embodiment of the present invention is to make it available as a continuous roll of material. In this particular embodiment, the material comprising the invention would be available on a roll, similar to the mechanism of dispensing ordinary paper towel. The user would unroll the invention material to the length suitable for the particular size grill to be cleaned, and the appropriate length removed from the roll via a method such as ripping, cutting, or tearing at a perforation. The invention would then be used in the manner previously described in this is application.

Importantly, it should be noted that the present invention could be designed to be either reusable (whereby it is rinsed/washed and dried for its next use) or disposable (whereby it would be discarded after a one-time use).

Although the description above contains many specificities, these should not be construed as limiting the scope of the invention but as merely providing illustrations of some of the presently preferred embodiments of this invention. For instance, if a grill to be cleaned has waffled instead of wavy heating platters, the present invention would ideally be comprised of an absorbent material with a waffled pattern that meshes with the waffled pattern of the heating platters. And even though the invention is designed for cleaning the cooking surfaces of electric grills, it could easily be envisioned for cleaning the cooking surfaces of gas grills and other types of cooking systems.

Thus, although the invention has been described in detail with the preferred embodiments thereof, it will be appreciated that upon a reading and understanding of the foregoing, certain variations to the preferred embodiments will become apparent, which variations are nonetheless within the spirit and scope of the invention and the appended claims.

I claim:

1. A method for cleaning electric grills with an upper heating platter and a lower heating platter, and baked-on food elements, said method comprising the steps of:

(a) wetting a sheet of fluid-absorbent material constructed to conform to contours of said upper heating platter and said lower heating platter, (b) inserting said sheet of fluid-absorbent material in between said upper heating platter and said lower heating platter after said upper heating platter and said lower heating platter are cooled from cooking, (c) closing said electric grill, (d) allowing said sheet of fluid-absorbent material to soften and break down adhesion bonds of the baked-on food elements, (e) opening said electric grill, and (f) wiping away the baked-on food elements.

2. The method of claim 1 whereby said fluid-absorbent material is made of natural sponge.

3. The method of claim 1 whereby said fluid-absorbent material is made of synthetic sponge.

4. The method of claim 1 whereby said fluid-absorbent material is made of foam rubber.

5. The method of claim 1 whereby said fluid-absorbent material is made of foam synthetic material.

6. The method of claim 1 whereby said fluid-absorbent material is made of paper.

7. The method of claim 1 whereby said fluid-absorbent material is made of cloth.

8. The method of claim 1 whereby said fluid-absorbent material is impregnated with a cleaning substance.

9. The method of claim 1 whereby said fluid-absorbent material is impregnated with a surfactant.

10. The method of claim 1 whereby said fluid-absorbent material is impregnated with a germicide.

11. The method of claim 1 whereby said fluid-absorbent material is impregnated with a disinfectant.

12. The method of claim 1 whereby said fluid-absorbent material is impregnated with a bactericide.

* * * * *